United States Patent
Andrews

[11] 3,871,747
[45] Mar. 18, 1975

[54] OPTICAL WAVEGUIDE DISPLAY PANEL
[75] Inventor: Ronald A. Andrews, Alexandria, Va.
[73] Assignee: The United States of America as represented by the Secretary of the Navy, Washington, D.C.
[22] Filed: Oct. 3, 1972
[21] Appl. No.: 294,733

[52] U.S. Cl.............. 350/160 R, 350/96 WG
[51] Int. Cl. ............................. G02f 1/16
[58] Field of Search..... 350/96 WG, 160, 161, 96 C

[56] References Cited
UNITED STATES PATENTS
3,617,109  11/1971  Tien...................... 350/160
3,674,335  7/1972  Ashkin et al.............. 350/96 C

*Primary Examiner*—William L. Sikes
*Attorney, Agent, or Firm*—R. S. Sciascia; Arthur L. Branning; M. L. Crane

[57] ABSTRACT

An optical waveguide which is provided with a means such as structure or change of index of refraction of the material to deflect light out of the waveguide along a desired path.

16 Claims, 6 Drawing Figures

OPTICAL WAVEGUIDE DISPLAY PANEL

BACKGROUND OF THE INVENTION

This invention is directed to optical waveguides and more particularly to an optical waveguide display panel.

Heretofore, optical waveguides have been made as cylindrical tubular structures as well as flat surface structures. In the tubular structures, the waveguide is of a material that has an index of refraction which is greater than the medium on its outer side to provide confinement of the light passing through the waveguide material. In the flat surface type, the waveguide is usually on a substrate which has a smaller index of refraction than the waveguide whereas the outer medium has an index of refraction which is less than the waveguide material. Such waveguides have been used to transmit light from a source to a desired station and may be used for communications, light signals, visual displays, etc. Additionally, light pipes or guides are used in conjunction with image tubes and cathode ray tubes. Other visual displays involve liquid crystal devices, light emitting diode arrays and plasma display panels. Such devices are usually complex and expensive thereby leaving room for more desirable and less expensive devices.

SUMMARY OF THE INVENTION

The invention is directed to optical waveguide display panels which are efficient and have high speed. The display panels are made by use of a thin slab of dielectric material with an index of refraction higher than the index of refraction of the medium, above and below, in contact therewith. Light travelling in the waveguide will be scattered out of the guide region upon encountering an abrupt discontinuity in the waveguide or by a change in the index of refraction of the waveguide or surrounding medium. The height of the waveguide region is on the order of the wavelength of light whereas its width may be from infinite to approximately its height.

STATEMENT OF THE OBJECTS

It is therefore an object of the present invention to provide an efficient, high speed, optical display panel.

Another object is to provide a simple relatively inexpensive, optical display panel.

Still another object is to provide an optical display panel which may be controlled by a plurality of different ways.

Other objects and advantages of the invention will become obvious from the following specification when considered with the drawings.

DESCRIPTION OF THE INVENTION

Figure 1:
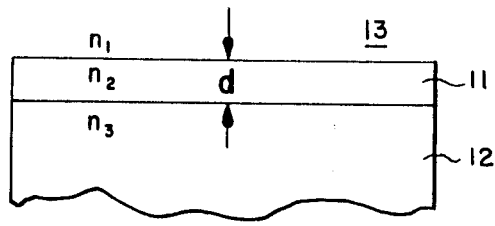
FIG. 1 illustrates a well known optical waveguide.

Now referring to FIG. 1, there is shown by illustration a well known optical waveguide comprising a thin slab of dielectric material 11 supported by a mechanically stable dielectric substrate material 12. The thin slab of dielectric material 11 has an index of refraction, $N_2$, which is higher than the index of refraction $N_3$ of a substrate on the lower side, and the index of refraction, $N_1$, of the substance on the outer side which may be air 13 or some other material, therefore $N_1 < N_2 > N_3$. The thickness, $d$, of the optical waveguide slab 11 is typically on the order of the wavelength of light. The width may be any width from infinite to approximately that of the height, $d$. Light incident on the end of the optical waveguide dielectric material will pass within the material and be retained within the waveguide section. Due to the index of refraction of the sections on opposite sides of the waveguide slab, the light will be reflected many times at the interface as it passes through the waveguide slab.

Figure 2:
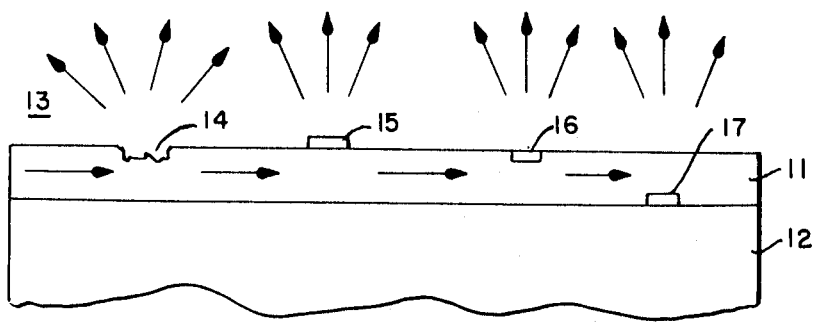
FIG. 2 illustrates different mechanical means by which light travelling in a waveguide may be scattered out of the waveguide.

It has been determined that light may be scattered out of the optical waveguide if it encounters an abrupt discontinuity in the waveguide or a change in the index of refraction of the waveguide or of the medium on either side. FIG. 2 illustrates an optical waveguide such as in FIG. 1 which illustrates four different means by which light may be scattered from an optical waveguide.

Case 1, illustrates a scratch 14 or a pit in the face of the waveguide dielectric material.

Case 2, illustrates a foreign dielectric or metal material 15 deposited on the upper surface of the optical waveguide dielectric slab.

Case 3, illustrates the same type of dielectric or metal material deposited within the optical waveguide slab or near the top surface thereof.

Case 4, illustrates a foreign dielectric or metal material 17 deposited onto the upper surface of the lower substrate and within the optical waveguide slab.

The optical waveguide may be made with any one of the situations as shown for cases 1–4 whereby light passing through the optical waveguide slab will encounter the scratch or pit or the metal or foreign dielectric material which ever may be made into the optical waveguide and then be scattered out of the waveguide in all directions as shown by the arrows.

Figure 3:
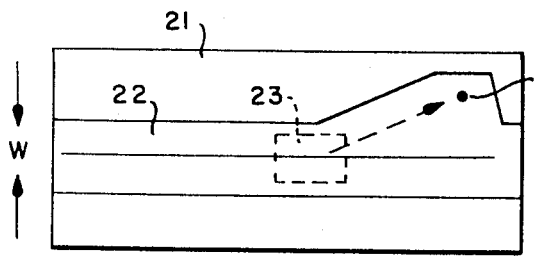
FIG. 3 illustrates a light waveguide including a controlled means for changing the path of light travelling through the waveguide.
Figure 4:
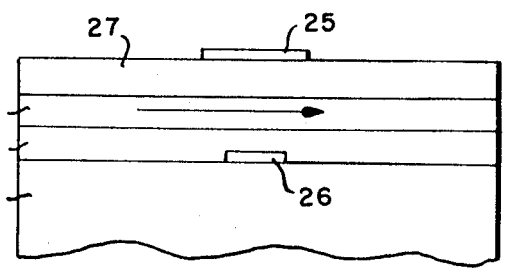
FIG. 4 illustrates a cross-sectional view of another control means for controlling the path of light passing through a waveguide.

The teaching of scattering light out of a waveguide may be applied to display panels in which the basic element is a waveguide with a means of deflecting the guided light so that it encounters a scattering center appropriately placed within the waveguide. Such a structure is shown in FIGS. 3 and 4. As shown, the structure includes a substrate 21, a waveguide 22, having a width, $\omega$, which includes therein a deflector 23 followed by an enlarged section which includes therein a scattering center 24. The deflector is an area where the index of refraction of the waveguide or supporting substrate can be varied to produce a "Snell's law" type refraction of the guided light. As shown, the area is fabricated out of electrooptic material to which an electric field is applied by use of appropriately shaped electrodes 25 and 26. The electrodes are placed above and below the electrooptic material insulated therefrom by layers 27 and 28 and so shaped that light passing therethrough will be deflected when an electric field is applied. Without the electric field, the light will pass straight through the area and out of the end of the waveguide. With the electric field applied, the light will be deflected to the scattering center 24 and be scattered out of the waveguide through the scattering center. As shown, the electrodes are triangular shaped and so positioned that the light is deflected in the desired path to the scattering center.

Figure 5:
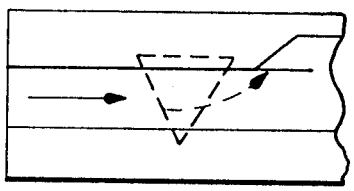
FIG. 5 is a top view of the device of FIG. 4.

The illustrations shown in FIGS. 3-5 are for a panel having a single deflector and scattering center. Obviously a system may be assembled to include a plurality of deflectors and scattering centers which is shown by illustration in FIG. 6. As shown, a plurality of optical waveguides 31 are supported upon substrate 32. Each waveguide includes a plurality of deflection zones 33 each coupled with a scattering center 34. Each of the deflectors have two electrodes, one above the deflection zone and one below the deflection zone. The electrodes are electrically connected such that the upper electrodes are connected to each other by columns 35 to separate connections 36 and the lower electrodes are connected to each other by rows 37 to separate electrical connections 38. Therefore, a voltage impressed between one connector 36 and one connector 38 will deflect light at the particular row and column location. The deflected light is then deflected to the scattering center adjacent the charged deflector zone where the light is scattered by the appropriate scattering center. By this arrangement light may scatter from the panel at any selected deflection zone. Light may be coupled into the plurality of waveguides individually such as by fiber optics or by one waveguide which couples a fraction into each of the display waveguides. The light source may also be a waveguide laser source such as an injection laser or semiconductor platelet laser.

Optical waveguides such as set forth above may have a width of 10 microns or less, therefore, a plurality of waveguides may be supported on a smaller space.

Figure 6:
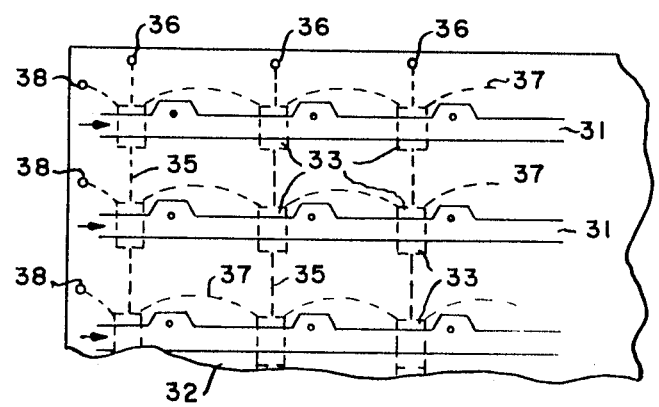
FIG. 6 illustrates a plurality of waveguides, one along side the other, with a control means for controlling light passing through the multiwaveguide.

The deflector has been set forth as electrical; however, the deflector may be based on any mechanism which alters the waveguide characteristics in such a manner that the light path is either deflected to a scattering center or terminated. Futhermore, in a display panel such as shown in FIG. 6, the electrodes could be a grid of conductive strips rather than electrically connected separate electrodes.

Obviously many modifications and variations of the present invention are possible in the light of the above teachings. It is therefore to be understood that within the scope of the appended claims the invention may be practiced otherwise than as specifically described.

What is claimed is:

1. An optical waveguide display panel; which comprises,
    a substrate,
    at least one slab or dielectric material of uniform thickness secured onto said substrate, said slab of dielectric material having an index of refraction higher than said substrate,
    a waveguide region formed by each of said slabs of dielectric material in which coupled light is trapped and directed along a trapped light optical path,
    at least one abrupt discontinuity means in each of said waveguide regions in optical alignment along the trapped light optical path of each of said waveguide regions forming at least one light scattering center in each waveguide region for scattering light out of said waveguide region upon encountering an abrupt discontinuity means therein,
    whereby light scattered out of each waveguide region by each of said abrupt discontinuity means is scattered in all possible directions from said waveguide region.

2. An optical waveguide display panel as claimed in claim 1; in which,
    said display panel includes only one slab of dielectric material including only one waveguide region therein.

3. An optical waveguide display panel as claimed in claim 2; in which,
    said one waveguide region includes only one abrupt discontinuity means forming one light scattering center therein.

4. An optical waveguide display panel as claimed in claim 3; in which,
    said light scattering center is along the upper surface of said waveguide region.

5. An optical waveguide display panel as claimed in claim 3; in which,
    said light scattering center is located along the bottom surface of said waveguide region.

6. An optical waveguide display panel as claimed in claim 2; in which,
    said one waveguide region includes a plurality of abrupt discontinuity means therein in optical alignment with each other thereby forming a plurality of optically aligned light scattering centers therein.

7. An optical waveguide display panel as claimed in claim 6; in which,
    each of said plurality of light scattering centers are located along the upper surface of said waveguide region.

8. An optical waveguide display panel as claimed in claim 6; in which,
    said light scattering centers are located along the upper and lower surfaces of each of said waveguide regions.

9. An optical waveguide display panel as claimed in claim 1; in which,
    said display panel includes a plurality of side-by-side slabs of dielectric material each including a waveguide region therein.

10. An optical waveguide display panel as claimed in claim 9; in which,
    each of said waveguide regions includes only one abrupt discontinuity means forming one light scattering center in each waveguide region.

11. An optical waveguide display panel as claimed in claim 10; in which,
    each of said light scattering centers are located along the upper surface of each of said plurality of waveguide regions.

12. An optical waveguide display panel as claimed in claim 9; in which,
    each of said plurality of waveguide regions include a plurality of abrupt discontinuity means therein in optical alignment with each other thereby forming a plurality of light scattering centers in each of said waveguide regions.

13. An optical waveguide display panel as claimed in claim 12; in which, each of said light scattering centers in each waveguide region are located along the upper surface of each plurality of waveguide regions.

14. An optical waveguide display panel as claimed in claim 1; which comprises,
a light deflector means within said display panel in the optical path of each of said waveguide regions preceeding each of said light scattering centers formed by said abrupt discontinuity means therein for deflecting light from its normal optical path within said waveguide regions to said light scattering center of which it preceeds.

15. An optical waveguide display panel as claimed in claim 14; wherein,
said light deflector means in an electrooptic material in said waveguide region.

16. An optical waveguide display panel as claimed in claim 5; wherein,
said electrooptic material includes an electrode on directly opposite sides thereof.

* * * * *